United States Patent [19]
Heilig

[11] Patent Number: 6,053,656
[45] Date of Patent: Apr. 25, 2000

[54] FASTENER DEVICE FOR ARRESTING A VEHICLE STEERING WHEEL TO A STEERING SHAFT

[75] Inventor: Alexander Heilig, Wissgoldingen, Germany

[73] Assignee: TRW Occupant Restraint Systems GmbH, Alfdorf, Germany

[21] Appl. No.: 08/974,872

[22] Filed: Nov. 20, 1997

[30] Foreign Application Priority Data

Nov. 22, 1996 [DE] Germany ........................ 296 20 375 U

[51] Int. Cl.⁷ ........................................ B25G 3/02
[52] U.S. Cl. ...................... 403/362; 403/371; 403/374.3
[58] Field of Search ................ 403/362, 359.1, 403/359.5, 371, 373, 374.1, 374.2, 374.3

[56] References Cited

U.S. PATENT DOCUMENTS

| | | | |
|---|---|---|---|
| 1,281,773 | 10/1918 | Foster | 403/374.3 X |
| 3,009,747 | 11/1961 | Pitzer | 403/371 X |
| 3,463,520 | 8/1969 | Turro | 403/362 |
| 4,512,681 | 4/1985 | Hayhurst et al. | 403/371 X |
| 4,529,332 | 7/1985 | Glabiszewski | 403/362 X |
| 4,655,632 | 4/1987 | Smith | 403/362 |
| 4,915,523 | 4/1990 | Andersson | 403/362 X |
| 5,002,422 | 3/1991 | Schremmer et al. | 403/359.5 |
| 5,718,151 | 2/1998 | Parrish et al. | 403/359.1 X |
| 5,816,113 | 10/1998 | Fohl | 403/359.5 X |

FOREIGN PATENT DOCUMENTS

| | | |
|---|---|---|
| 0538666 | 4/1993 | European Pat. Off. . |
| 0 769 441 | 4/1997 | European Pat. Off. . |
| 295 16 626 | 1/1996 | Germany . |
| 2310026 | 8/1997 | United Kingdom . |

*Primary Examiner*—Terry Lee Melius
*Assistant Examiner*—William L. Miller
*Attorney, Agent, or Firm*—Tarolli, Sundheim, Covell, Tummino & Szabo L.L.P.

[57] ABSTRACT

A fastener device for arresting a hub of a vehicle steering wheel to one end of a steering shaft includes a non-rotatable shaft/hub connection between the hub and the end of the steering shaft and an annular spring element which forms an interlocking fit between the hub and the steering shaft. The interlocking fit is effective in the direction of the longitudinal axis of the steering shaft. The steering shaft comprises a raised face, the face surface area of which facing away from the steering wheel continues into a smaller shaft diameter. The spring element comprises an inner diameter which is smaller with respect to the outer diameter of the raised face. The spring element is radially pliable over at least a part of its axial length and can be fitted over the steering shaft together with the hub and reaches behind the raised face.

13 Claims, 7 Drawing Sheets

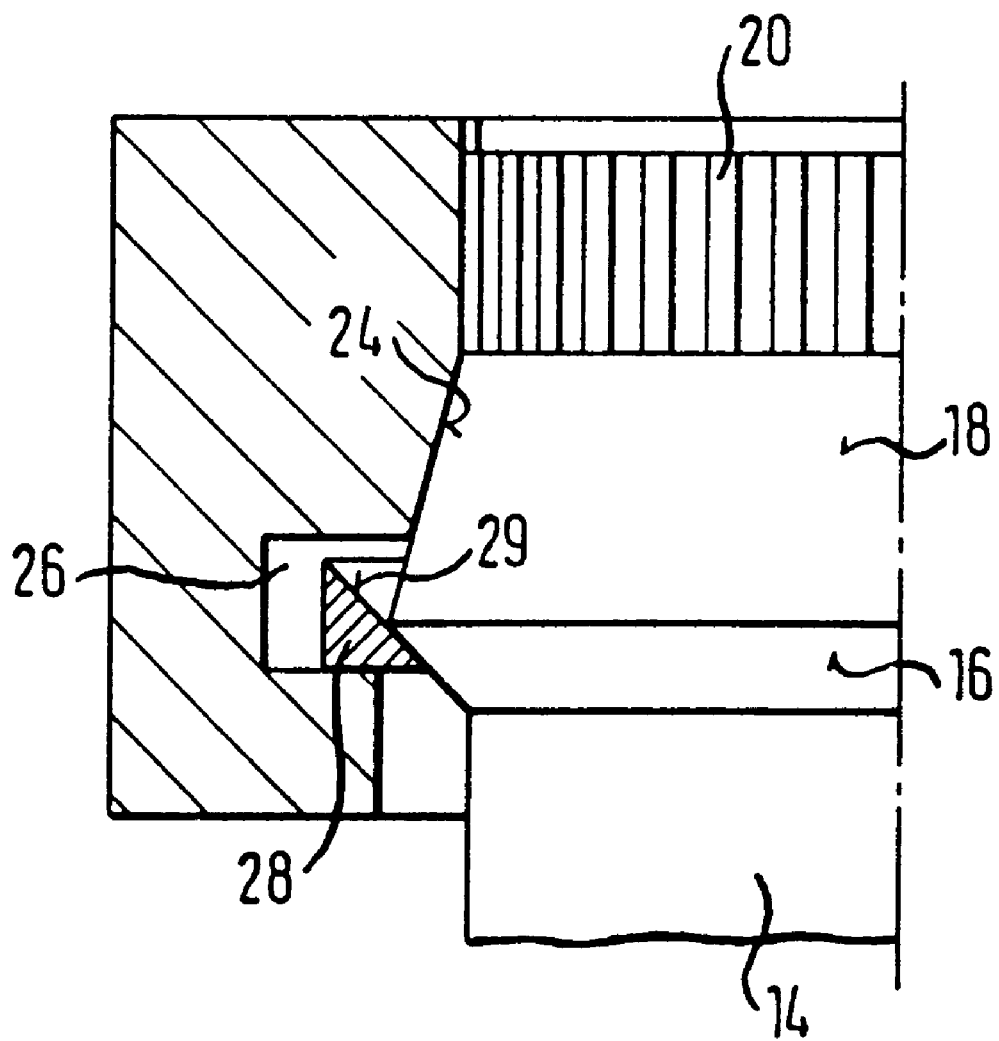

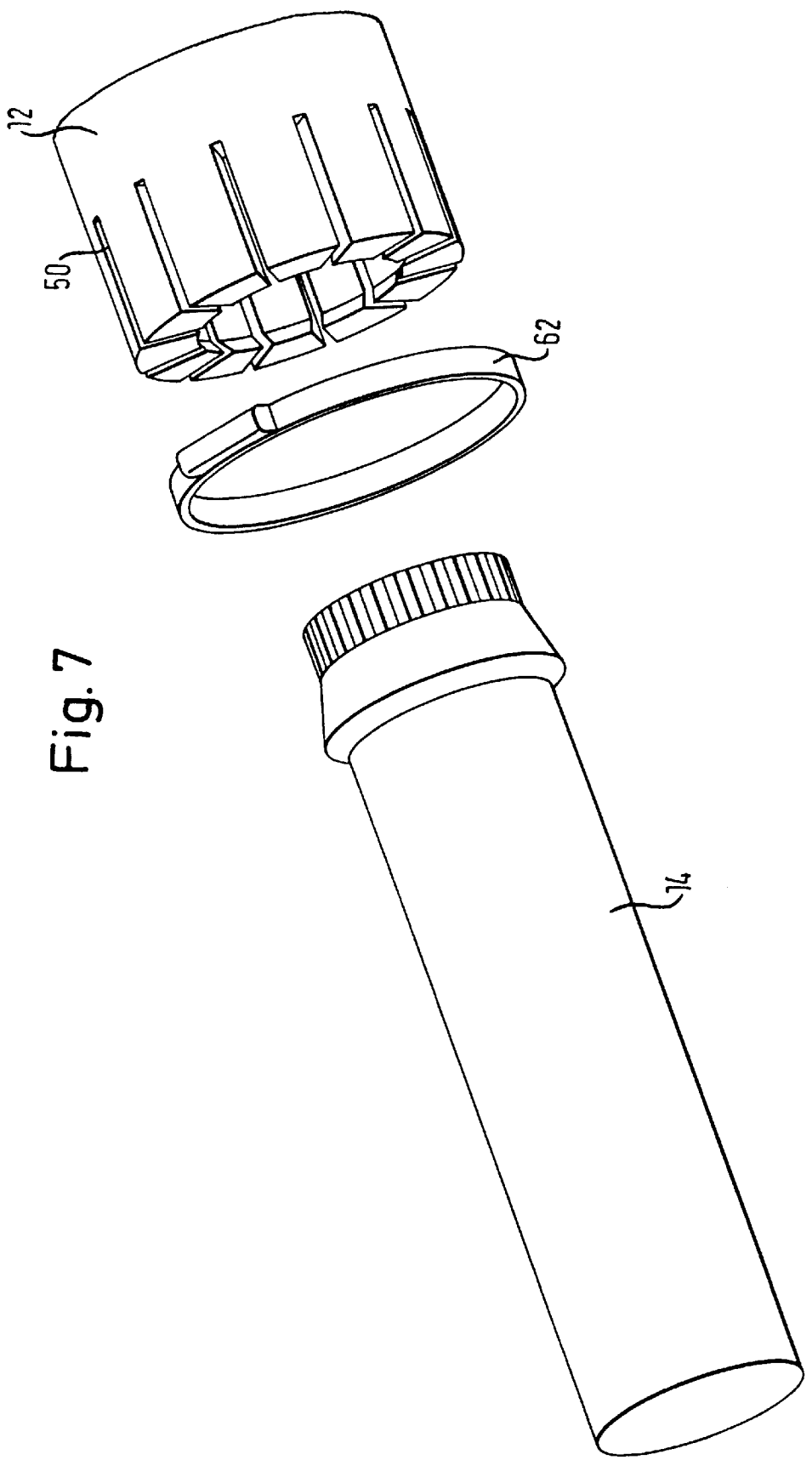

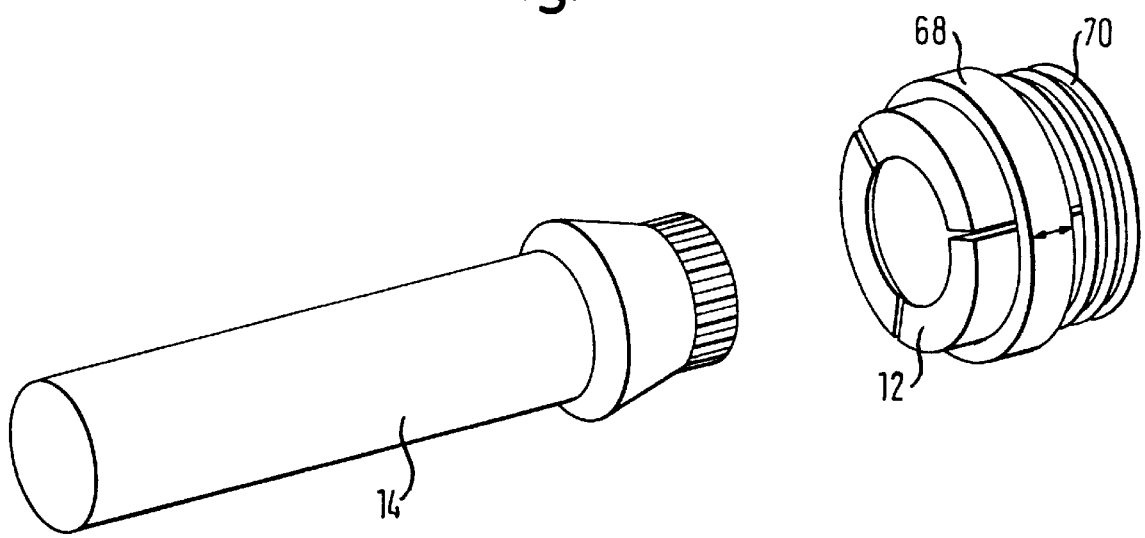

FASTENER DEVICE FOR ARRESTING A VEHICLE STEERING WHEEL TO A STEERING SHAFT

TECHNICAL FIELD

The invention relates to a fastener device for arresting a hub of a vehicle steering wheel to one end of a steering shaft.

BACKGROUND OF THE INVENTION

A fastener device known from DE 295 16 626 includes a non-rotatable shaft/hub connection between the hub and the end of the steering shaft and an annular spring element which forms an interlocking fit between the hub and the steering shaft in the direction of the longitudinal axis of the steering shaft. The spring element is configured as a union nut which is applied to the steering shaft rotatable but axially locked and can be screwed onto a male thread on the hub. By means of this fastener device accidental release of the connection between steering shaft and hub is prevented.

BRIEF SUMMARY OF THE INVENTION

The invention provides a fastener device by means of which arresting the vehicle steering wheel to a steering shaft can be achieved even quicker and simpler than by means known hitherto without the risk of the connection releasing. In addition, any axial or circumferential play between the steering wheel and the steering shaft is eliminated. As a result of the fastener device in accordance with the invention particularly vehicle steering wheels can be installed very simply in which a gas bag restraint system is already fitted. The fastener device according to the invention for arresting a hub of a vehicle steering wheel to one end of a steering shaft includes a non-rotatable shaft/hub connection between the hub and the end of the steering shaft, and an annular spring element which forms an interlocking fit between the hub and the steering shaft. The interlocking fit is effective in the direction of the longitudinal axis of the steering shaft. The steering shaft comprises a raised face, the face surface area of which facing away from the steering wheel continues into a smaller shaft diameter. The spring element comprises an inner diameter which is smaller with respect to the outer diameter of the raised face. Furthermore, the spring element is radially pliable over at least a part of its axial length and can be fitted over the steering shaft together with the hub and reaches behind the raised face.

The fastener device in accordance with the invention is configured as a snap-action connection. The actual procedure in fitting the steering shaft thus consists substantially merely in sticking the steering wheel hub onto the steering shaft.

One face surface area of the raised face which faces away from the steering wheel is configured preferably as a tapered surface area, stated in the following as a rearside tapered surface area. The spring element having a corresponding tapered surface area engages on this rearside tapered surface area, is radially pretensioned and thereby produces an axial force. To prevent any axial play the shaft comprises additionally a tapered surface area at the front end facing the steering wheel and the hub features a tapered mount against the inner surface area of which the front-side tapered surface area is biased. At the rearside tapered surface area the spring element produces the axial force which is necessary to bias the inner surface area against the front-side tapered surface area and to lock the hub to the steering shaft axially, radially and circumferentially.

In accordance with a first embodiment the spring element is configured as a slotted ring which is received in a circumferential groove on the inner side of the hub as a result of which the axial force produced by the spring element is introduced into the hub.

A second embodiment provides for the spring element not being configured as a separate part, it instead being integrally connected to the hub by one receiving end of the hub, with which the hub is mounted on the steering shaft, being configured as the spring element. The hub comprises at the receiving end at least one radial full-length slot for producing the radial pliancy.

In addition it is, however, of advantage when a locking element is provided at an end facing away from the outer shell surface area of the hub in the region of the steering wheel, this being configured so that it produces a force oriented radially inwards and prevents the steering wheel from being pulled from the steering shaft by force.

The locking element may be configured as a rotary ring having an inner surface which is non-circular-cylindrical. The spring element also comprises a non-circular-cylindrical outer shell surface area which is configured so that by rotating the locking element the force oriented radially inwards can be produced.

Furthermore, the locking element may also be configured as a clamp or as an axially shiftable ring.

BRIEF DESCRIPTION OF THE DRAWINGS

FIG. 3b is a magnified view of the region marked X in FIG. 3a;

FIG. 7 shows a steering shaft and a hub which are connected to each other by the fastener device in accordance with the invention in a fourth embodiment, and FIG. 8 shows a steering shaft and a hub which are connected to each other by the fastener device in accordance with the invention in a fifth embodiment.

DETAILED DESCRIPTION OF PREFERRED EMBODIMENTS

Figure 1:
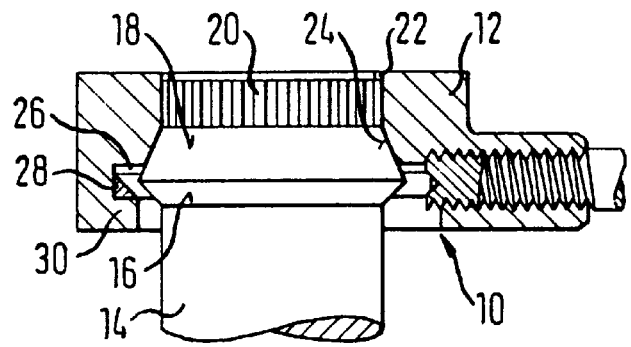
FIG. 1 is a longitudinal section view of the steering shaft including a steering wheel hub secured thereto by the fastener device in accordance with the invention in a first embodiment.
Figure 3A:
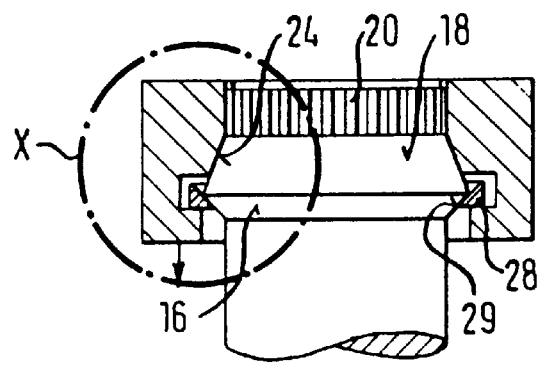
FIG. 3a is a section view along the line III—III in FIG. 1.

In FIG. 1 a first embodiment of a fastener device 10 for arresting a hub 12 of a vehicle steering wheel (not shown fully) to one end of a steering shaft 14 is shown. The steering shaft 14 features in the region of its end a raised face defined by a rearside tapered surface area 16 facing away from the steering wheel, and a front-side tapered surface area 18 facing the steering wheel. The angle of taper of the rearside tapered surface area 16 is in this arrangement significantly greater than that of the front-side tapered surface area 18. Adjoining the front-side tapered surface area 18 directly is a splined shaft profile 20 which engages in a corresponding splined hub profile 22 in the hub 12 so that the hub 12 is connected to the steering shaft 14 non-rotatably. In the region of the front-side tapered surface area 18 the hub 12 features a corresponding tapered mount having an inner surface area 24 which engages the tapered surface area 18. In the region of the largest diameter of the raised face, on the inner side of the hub 12, a circumferential groove 26 is provided in which a spring element 28 is received as a slotted ring. The spring element 28 has a triangular cross-sectional shape with an inclined tapered surface area 29 parallel to the tapered surface area 18. The inner diameter of the spring element 28 is smaller than the outer diameter of the raised face on the steering shaft 14. A collar 30 of the hub 12 adjoining the groove 26 features an inner diameter which is slightly smaller than the outer diameter of the raised face so that the hub 12 together with the radially pliant spring element 28 can be sticked onto on the end of the steering shaft 14, the spring element 28 forming a snap-action connection reaching behind the raised face in the locked position as shown in FIG. 1. As is evident from the FIGS. 3a und 3b the tapered surface area 29 engages in a pretensioned manner the rearside tapered surface area 16 in the fitted condition of the steering wheel. Thereby, in the locked position, an axial force is produced due to the spring element 28 forcing the hub on to the steering shaft 14 in the direction of the arrow as shown in FIG. 3a. The inner surface area 24 engages the front-side tapered surface area 18 so that the steering shaft 14 is connected to the hub 12 not only by the splined shaft/splined hub connection but also by a taper seat. This taper seat in conjunction with the spring element 28, the axial forces of which are introduced into the hub 12 via the walls of the groove 26, also generates an axial seating of the hub 12 on the steering shaft 14 free from play.

The force of the spring element 28 oriented radially inwards may be further increased by providing a locking screw 36. This locking screw 36 is screwed into a female thread in a tubular radial protrusion 38 of the hub 12 and characterized by a conically hollowed face end. At the circumferential ends of the spring element 28 protrusions 40 protruding radially outwards are provided which together comprise a conical shape matching that of the hollowed face end of the locking screw 36. By screwing in the locking screw 36 the protrusions 40 are moved towards each other circumferentially as a result of which the inner diameter of the spring element 28 is reduced. On the side diametrally opposed to the protrusions 40 the spring element 28 is supported by a recess 42 at the groove 26.

To secure the steering wheel to the steering shaft 14 the hub 12 merely needs to be sticked onto the end of the steering shaft 14. Then the locking screw 36 is screwed into place.

Figure 4:
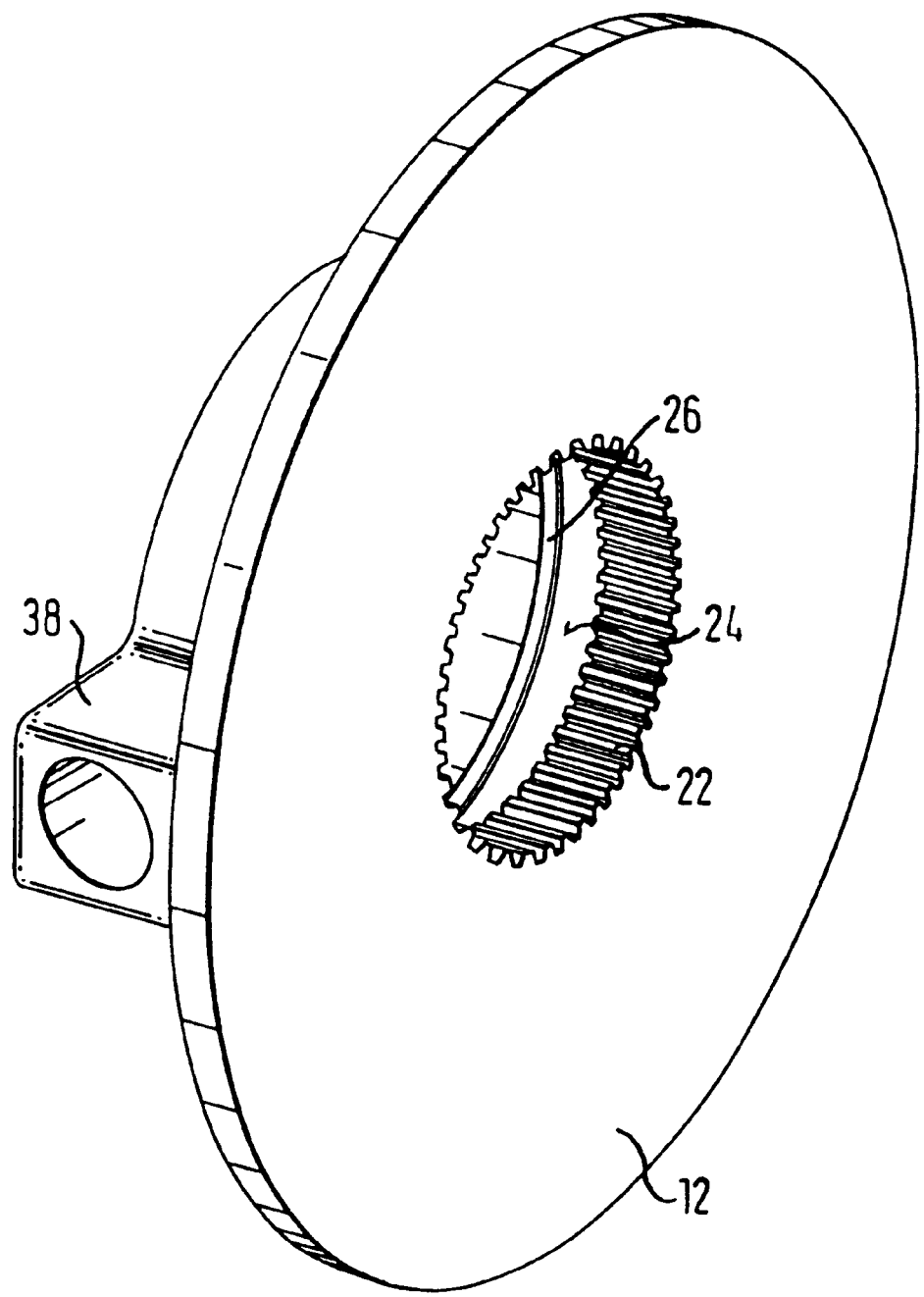
FIG. 4 is a perspective view of the hub of the vehicle steering wheel shown in FIG. 1.

In FIG. 4 the hub 12 is shown perspectively without the spring element 28.

Figure 2:
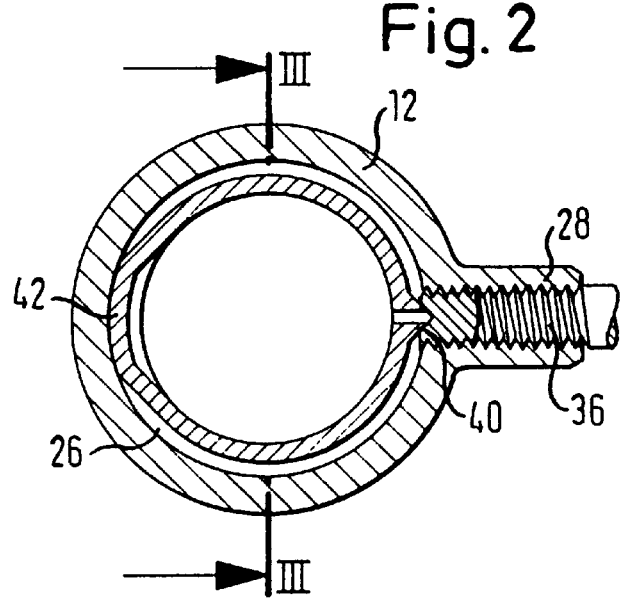
FIG. 2 is a cross-sectional view of the steering shaft and the hub according to FIG. 1.

In the case of the further embodiments of the fastener device, the latter is configured as a snap-action connection for facilitated mounting. In the second embodiment of the fastener device depicted in FIG. 5, the steering shaft 14 is no different from the steering shaft 14 shown in FIGS. 1 to 3. The spring element 28 is not configured as a separate part, the receiving end of the hub 12, with which the hub 12 is sticked onto the steering shaft 14, being instead configured as the spring element by the inner surface area 24 adjoining a collar 48 protruding radially inwards. This collar features a tapered surface area 52 sitting close on the tapered surface area 16 in the fitted condition of the steering wheel. Several radially extending through slots 50 in the hub 12 endow the receiving end with a radial pliancy. The inner side of the hub 12 is, the same as in the case of of the embodiment depicted in FIGS. 1 to 3, provided with a splined hub profile 22 and the inner surface area 24 adjoining the latter. The steering wheel is mounted on the end of the steering shaft 14 by its hub 12 in the direction of the arrow, the collar 48 thereby sliding along the tapered surface area 18 as a result of which the hub 12 is flared radially until in conclusion the collar 48 has attained the rearside tapered surface area 16 in press-contact therewith. The radial force has, due to the tapered surface area 16, an axial force component by means of which the hub 12 is retained free from axial or circumferential play on the steering shaft.

Figure 5:
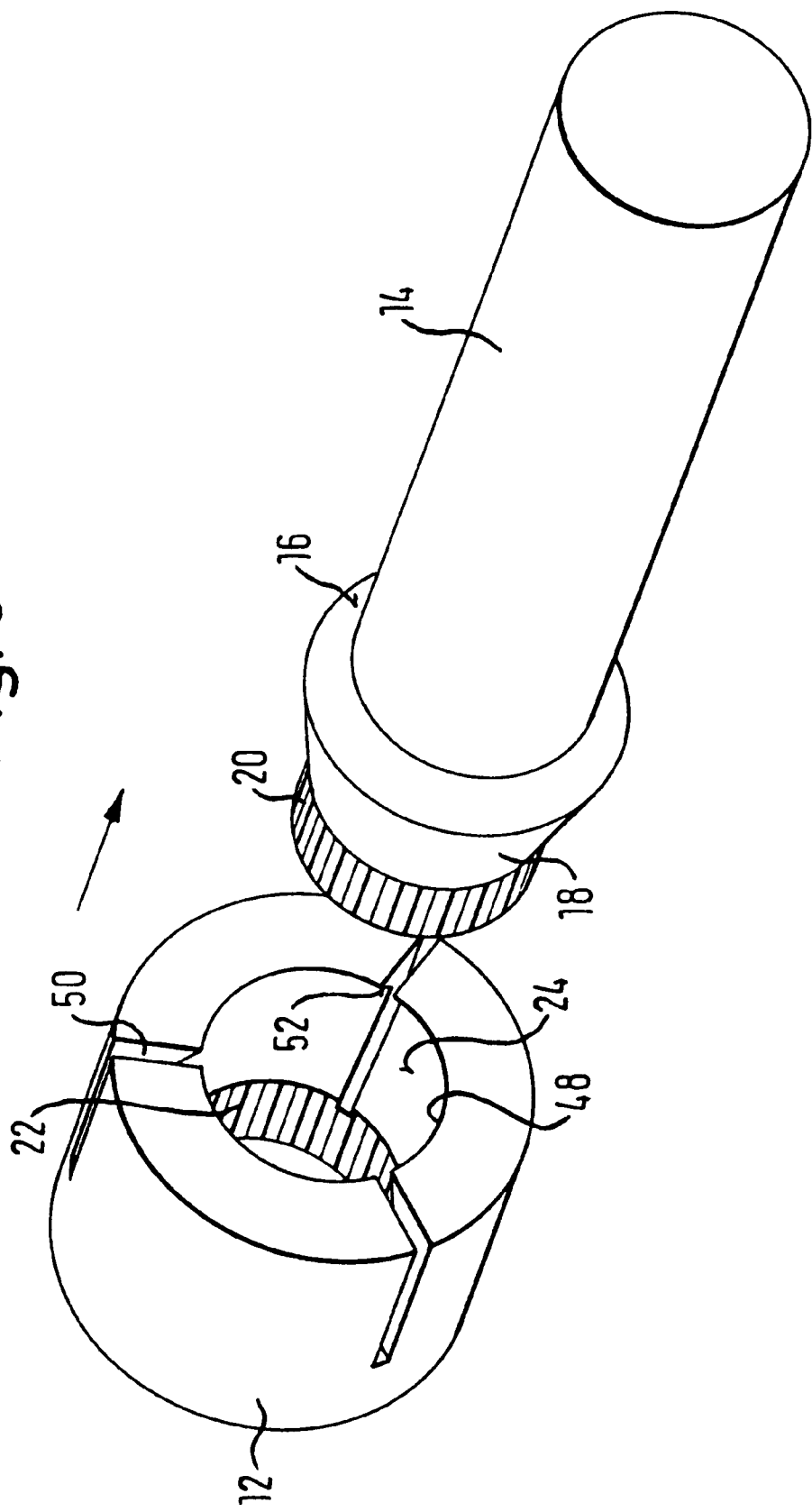
FIG. 5 shows a steering shaft and a hub which are connected to each other by the fastener device in accordance with the invention in a second embodiment.
Figure 6:
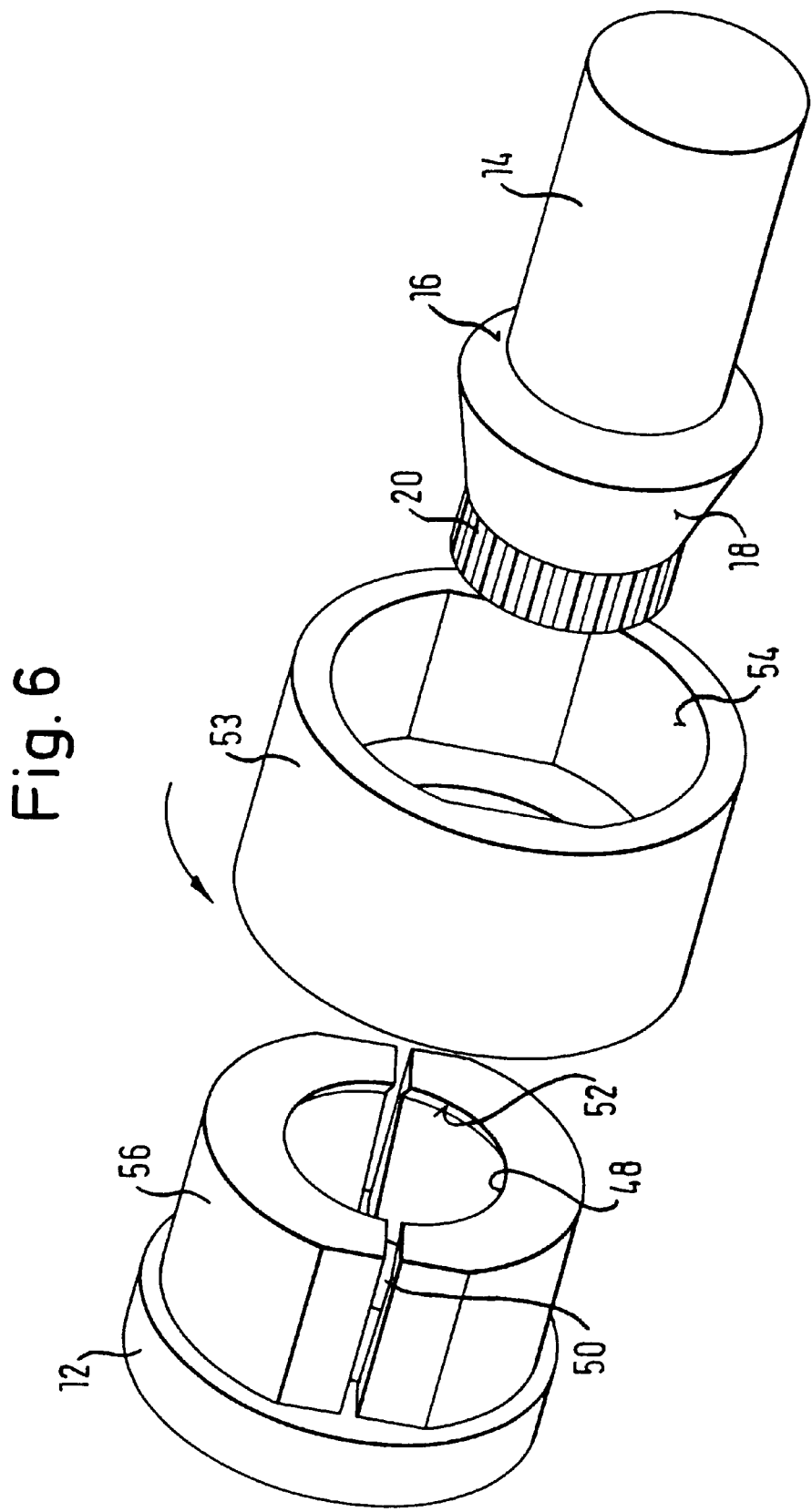
FIG. 6 shows a steering shaft and a hub which are connected to each other by the fastener device in accordance with the invention in a third embodiment.

The embodiment depicted in FIG. 6 differs from that shown in FIG. 5 in that an additional locking element is provided which prevents the hub 12 from being pulled off of the shaft 14 by it exerting a force oriented radially inwards on the hub 12 in the region of the slotted receiving end. The locking element is configured as a rotary ring 53 comprising an inner surface area 54 which is not circular-cylindrical but oval in cross-section. The receiving end of the hub 12 also features an outer shell surface area 56 which is likewise not circular-cylindrical but oval in cross-section. For fitting, the rotary ring 53 is slipped over the shell surface area 56 and the hub 12 sticked onto the steering shaft 14 together with the rotary ring 53. Subsequently, by rotating the ring 53 on the receiving end of the hub 12 a force oriented radially inwards is generated so that the tapered surface area 52 in the region of of the collar 48 forming the spring element is biased even further against the rearside tapered surface area 16.

Instead of the rotary ring 53 a clamp 62, e.g. in the form of a kind of hose clamp, as is shown in FIG. 7, may be made use of, which is slipped over on the slotted receiving end of the hub 12 and tightened following installation of the hub 12.

In the fifth embodiment of the fastener device shown in FIG. 8 the locking element is configured as a ring 68 axially shiftable on the outer shell surface area of the hub 12. Between the ring 68 and a stop (not shown) on the rearside of the steering wheel a pretensioning element in the form of a spring 70 is mounted on the hub. The spring 70 shifts the ring 68 in the direction of the end of the hub 12. Since the outer shell surface area of the hub 12 is slightly conically flared towards the receiving end, the ring 68 is unable to slip off of the hub 12. For fitting the steering wheel the ring 68 is pushed against the force of the spring 70 slightly in the direction of the steering wheel, and then the hub 12 is sticked on the steering shaft 14, the hub 12 is flared slightly radially. After the hub 12 has been mounted, the ring 68 can again be released so that it due to the spring 70 is shifted axially towards the receiving end until it clamps in place on the conical outer shell surface area. In this arrangement a force oriented radially inwards is exerted on the hub 12 which allows the hub 12 to be even more firmly seated on the steering shaft 14. Without the ring 68 being shifted the hub 12 can no longer be removed from the steering shaft 14. Due to the axial force exerted by the spring 70 on the ring 68 any unintentional release of the ring 68 on the outer shell surface area is eliminated.

I claim:

1. Apparatus including:
    a vehicle steering wheel hub,
    an end of a steering shaft, and
    a shaft-hub connection between said hub and said end of said steering shaft connecting said hub and said steering shaft for joint rotation, said shaft-hub connection comprising an annular spring element which forms an interlocking fit between said hub and said end of said steering shaft, said fit blocking relative movement of said hub and said end of said steering shaft in the direction of the longitudinal axis of the steering shaft, said end of said steering shaft comprising a raised face with an outer diameter, said raised face being integral with said end of said steering shaft and having a face surface area which faces away from said hub, said spring element having an inner diameter which is smaller than said outer diameter of said raised face, and said spring element being radially pliable over at least a part of the axial length of said spring element so that at least a part of said spring element can expand due to its pliability over said raised face as said spring element and said hub move in the axial direction of said steering shaft to locate said part of said spring element axially on the side of said raised face which faces away from said hub; and said raised face including a rearside tapered surface area which comprises said face surface area which faces away from said hub, and wherein said spring element has a corresponding tapered surface area which engages said rearside tapered surface area and is radially tensioned to produce an axial force, said raised face of said steering shaft further comprising a front-side tapered surface area facing away from said rearside tapered surface area, said hub having a tapered inner surface area, said inner surface area of said hub being biased by said spring element against said front-side tapered surface area;

said front-side tapered surface area directly adjoins said rearside tapered surface area.

2. Apparatus including:

a vehicle steering wheel hub, an end of a steering shaft, and a shaft-hub connection between said hub and said end of said steering shaft connecting said hub and said steering shaft for joint rotation, said shaft-hub connection comprising an annular spring element which forms an interlocking fit between said hub and said end of said steering shaft, said fit blocking relative movement of said hub and said end of said steering shaft in the direction of the longitudinal axis of the steering shaft, said end of said steering shaft comprising a raised face with an outer diameter, said raised face being integral with said end of said steering shaft and having a face surface area which faces away from said hub, said spring element having an inner diameter which is smaller than said outer diameter of said raised face, and said spring element being radially pliable over at least a part of the axial length of said spring element so that at least a part of said spring element can expand due to its pliability over said raised face as said spring element and said hub move in the axial direction of said steering shaft to locate said part of said spring element axially on the side of said raised face which faces away from said hub; and said hub comprising an inner circumferential groove in which said spring element, comprising a slotted ring with two circumferential ends, is received; and a locking screw for moving said two circumferential ends of said spring element towards each other reducing the diameter of said spring element.

3. Apparatus including:

a vehicle steering wheel hub, an end of a steering shaft, and a shaft-hub connection between said hub and said end of said steering shaft connecting said hub and said steering shaft for joint rotation, said shaft-hub connection comprising an annular spring element which forms an interlocking fit between said hub and said end of said steering shaft, said fit blocking relative movement of said hub and said end of said steering shaft in the direction of the longitudinal axis of the steering shaft, said end of said steering shaft comprising a raised face with an outer diameter, said raised face being integral with said end of said steering shaft and having a face surface area which faces away from said hub, said spring element having an inner diameter which is smaller than said outer diameter of said raised face, and said spring element being radially pliable over at least a part of the axial length of said spring element so that at least a part of said spring element can expand due to its pliability over said raised face as said spring element and said hub move in the axial direction of said steering shaft to locate said part of said spring element axially on the side of said raised face which faces away from said hub; and said hub comprising an inner circumferential groove in which said spring element, comprising a slotted ring with two circumferential ends, is received; and a locking screw for moving said two circumferential ends of said spring element towards each other reducing the diameter of said spring element, and said two circumferential ends comprising outwardly projecting protrusions which supplement each other to form a cone and wherein said locking screw is screwed into a thread in said hub extending substantially in the radial direction and comprising a conically hollowed face end which receives said protrusions and moves them toward each other upon screwing-in of said locking screw.

4. Apparatus including:

a vehicle steering wheel hub, an end of a steering shaft, and a shaft-hub connection between said hub and said end of said steering shaft connecting said hub and said steering shaft for joint rotation, said shaft-hub connection comprising an annular spring element which forms an interlocking fit between said hub and said end of said steering shaft, said fit blocking relative movement of said hub and said end of said steering shaft in the direction of the longitudinal axis of the steering shaft, said end of said steering shaft comprising a raised face with an outer diameter, said raised face being integral with said end of said steering shaft and having a face surface area which faces away from said hub, said spring element having an inner diameter which is smaller than said outer diameter of said raised face, and said spring element being radially pliable over at least a part of the axial length of said spring element so that at least a part of said spring element can expand due to its pliability over said raised face as said spring element and said hub move in the axial direction of said steering shaft to locate said part of said spring element axially on the side of said raised face which faces away from said hub.

5. Apparatus as set forth in claim 4, wherein said raised face includes a rearside tapered surface area which comprises said face surface area which faces away from said hub, and wherein said spring element has a corresponding tapered surface area which engages said rearside tapered surface area and is radially tensioned to produce an axial force on said hub.

6. Apparatus as set forth in claim 5, wherein said raised face of said steering shaft comprises a front-side tapered surface area facing away from said rearside surface area, said hub having a tapered inner surface area, said inner surface area of said hub being biased by said spring element against said front-side tapered surface area.

7. Apparatus as set forth in claim 4, wherein said hub comprises an inner circumferential groove in which said spring element, comprising a slotted ring with two circumferential ends, is received.

8. Apparatus as set forth in claim 4, wherein a receiving end of said hub, by which said hub is mounted on said steering shaft, is configured as said spring element, and wherein said hub comprises at least one radial full-length slot for providing the pliability of said spring element.

9. Apparatus as set forth in claim 8, wherein a locking element surrounds an outer shell surface area of said hub in the region of said receiving end and applies a radially inward force to said receiving end.

10. Apparatus as set forth in claim 9, wherein said locking element is configured as a rotary ring having a noncircular-cylindrical inner surface, wherein said receiving end of said hub comprises a non-circular-cylindrical outer shell surface area, and wherein the radially inward force is generated by rotating said locking element relative to said receiving end.

11. Apparatus as set forth in claim 9, wherein said locking element is a clamp.

12. Apparatus as set forth in claim 9, wherein said locking element is a ring axially shiftable on said outer shell surface area of sai hub, wherein said outer shell surface area is flared in the direction of the receiving end, and wherein said ring tends to radially compress said receiving end by being shifted toward said steering shaft.

13. Apparatus as set forth in claim 12, wherein said ring is urged by a pretensioning element toward said steering shaft.

* * * * *